United States Patent
Aviv et al.

(10) Patent No.: US 9,589,359 B2
(45) Date of Patent: Mar. 7, 2017

(54) STRUCTURED STEREO

(71) Applicant: Intel Corporation, Santa Clara, CA (US)

(72) Inventors: Ziv Aviv, Bat Hefer (IL); David Stanhill, Hoshaya (IL); Dror Reif, Be'er-Yacoov (IL); Roi Ziss, Timrat (IL); Jeffrey Danowitz, Tel Aviv (IL); Ehud Pertzov, Tel-Mond (IL)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 14/260,783

(22) Filed: Apr. 24, 2014

(65) Prior Publication Data

US 2015/0310620 A1    Oct. 29, 2015

(51) Int. Cl.
*G01C 3/08* (2006.01)
*G06T 7/00* (2006.01)

(52) U.S. Cl.
CPC .......... *G06T 7/0075* (2013.01); *G06T 7/0057* (2013.01); *G06T 2207/10012* (2013.01); *G06T 2207/10048* (2013.01)

(58) Field of Classification Search
CPC ............................ G06T 7/0057; G06T 7/0075
USPC ...................................................... 356/4.01
See application file for complete search history.

(56) References Cited

U.S. PATENT DOCUMENTS

| | | | |
|---|---|---|---|
| 9,228,697 B2* | 1/2016 | Schneider | F16P 3/142 |
| 2004/0105580 A1 | 6/2004 | Hager et al. | |
| 2010/0118123 A1 | 5/2010 | Freedman et al. | |
| 2012/0293625 A1 | 11/2012 | Schneider et al. | |
| 2014/0307952 A1* | 10/2014 | Sweeney | H04N 13/0007 382/154 |

FOREIGN PATENT DOCUMENTS

KR    20130055088 A    5/2013

OTHER PUBLICATIONS

PCT International Search Report for Patent Application No. PCT/US2015/021133, issued Jul. 6, 2015, 3 pages.
Qiang et al., Accurate Depth Estimation Using Structured Light and Passive Stereo Disparity Estimation, 18th EEE International Conference on Imaging Processing, 2011, 5 pages.

* cited by examiner

*Primary Examiner* — Mark Hellner
(74) *Attorney, Agent, or Firm* — International IP Law Group, P.L.L.C.

(57) ABSTRACT

An apparatus, system, and method are described herein. The apparatus includes an emitter and a plurality of sensors. The emitter and the sensors are asymmetrically placed in the system with respect to the emitter. Data from the emitter and sensors is used to generate a high accuracy depth map and a dense depth map. A high resolution and dense depth map is calculated using the high accuracy depth map and the dense depth map.

24 Claims, 5 Drawing Sheets

STRUCTURED STEREO

TECHNICAL FIELD

The present techniques relate generally to depth maps. More specifically, the present techniques relate to generating depth maps using asymmetrically placed components.

BACKGROUND ART

Computing platforms such as computing systems, tablets, laptops, mobile phones, and the like include various imaging hardware and software modules that are used to capture images. In (stereo) imaging, two image sensors are present. The two sensors may be, for example, depth sensors, visible red green blue (RGB) spectrum sensors or infrared (IR) spectrum sensors, which may also include visible illumination or IR illumination.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
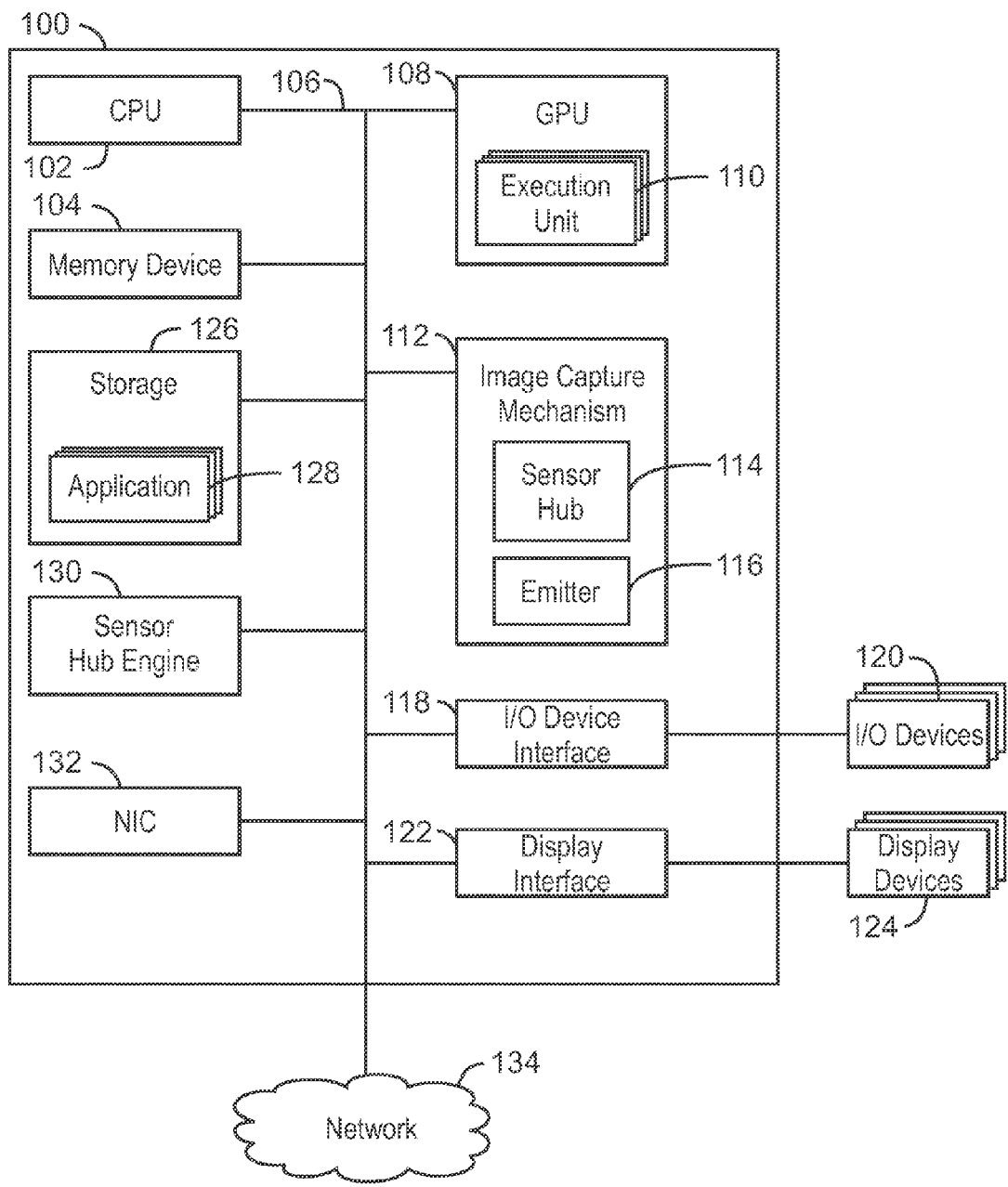
FIG. 1 is a block diagram of a computing device that may include structured stereo.

Depth extraction in passive stereo imaging using a pair of sensors involves the computation of relative offsets of object patches observed by both cameras, known as disparities. Although the present techniques are described using sensors, any image capture mechanism can be used, such as a camera, image sensor, or any combination thereof. The relative offsets are often calculated in pixels coordinates. To calculate these disparities, pixels in an image from a first sensor are matched to corresponding pixels in the other image from a second sensor. In uniform regions, where matching pixels between two images is challenging, if not nearly impossible. As used herein, uniform regions are portions of a plurality of images that are substantially similar such that the depth map returned in those regions is poor quality, if it can be found at all. Accordingly, uniform regions significantly reduce the quality of depth maps obtained by stereo camera systems.

Alternatively, active stereo is a method that improves the depth map by projecting a non-uniform texture on objects observed by the sensors, which fills uniform regions with a non-uniform texture. The non-uniform texture makes matching the uniform regions significantly easier by using infrared emitters to project the non-uniform texture so that a user cannot visualize the pattern projected on objects observed by the sensors. Accordingly, the sensors used in active stereo are infrared cut sensors. While the quality of the depth map obtained by active stereo is much better than in passive stereo, the disparity, and therefore the depth (Z) accuracy, decreases with distance especially for objects at a distance more than of one meter away from the emitter-sensor configuration. The distance at which the disparity and Z accuracy decreases is dependent on the system characteristics.

Embodiments described herein enable structured stereo, using asymmetric placement of the system components, which includes emitters and sensors. Contradicting effects on depth maps from the optical distance between components can be eliminated. In embodiments, active stereo techniques and structured light techniques are combined to obtain an accurate and dense depth map. Active stereo techniques provide depth maps that are more robust to environmental conditions and have a higher output resolution when compared to other techniques. Structured light (SL) techniques are considered accurate, and thereby ensure accuracy in the resulting depth map.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may include structured stereo. The computing device 100 may be, for example, a laptop computer, desktop computer, tablet computer, mobile device, or server, among others. The computing device 100 may also be a gaming device or part of a gaming system. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The instructions that are executed by the CPU 102 may be used to implement structured stereo. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100. In some embodiments, the GPU 108 includes a number of execution units 110, wherein each execution units 110 is configured to perform specific graphics tasks, or to execute specific types of workloads. For example, the GPU 108 may include an execution unit that produces depth maps based on asymmetrically placed sensors.

The computing device 100 includes an image capture device 112. In embodiments, the image capture device 112 is a camera, stereoscopic camera, infrared sensor, or the like. The image capture device 112 is used to capture image information. The computing device 100 may also include a sensor hub 114. The sensor hub 114 may include various sensors, such as a depth sensor, an image sensor, an infrared sensor, an X-Ray photon counting sensor or any combination thereof. A depth sensor of the sensor hub 114 may be used to capture the depth information associated with the image information captured by an image sensor of the sensor hub 114. In some embodiments, the sensor hub 114 is a component of the image capture mechanism 110. Additionally, in embodiments, the sensor hub 114 provides sensor data to the image capture mechanism. The sensors of the sensor hub 114 may include image sensors such as charge-coupled device (CCD) image sensors, complementary metal-oxide-semiconductor (CMOS) image sensors, system on chip (SOC) image sensors, image sensors with photosensitive thin film transistors, or any combination thereof. In some embodiments, the sensor hub 114 may be an Embedded Services Hub or may be implemented within an Embedded Services Hub.

The image capture mechanism may also include an emitter 116. The emitter may be used to project a non-uniform texture onto an object that can be used with the asymmetrically placed sensors to generate a depth map. In embodiments, the depth map is generated by analyzing variations between the pixels and capturing the pixels according to a desired resolution from the asymmetrically placed sensors.

The CPU 102 may be connected through the bus 106 to an input/output (I/O) device interface 118 configured to connect the computing device 100 to one or more I/O devices 120. The I/O devices 120 may include, for example, a keyboard and a pointing device, wherein the pointing device may include a touchpad or a touchscreen, among others. The I/O devices 120 may be built-in components of the computing device 100, or may be devices that are externally connected to the computing device 100.

The CPU 102 may also be linked through the bus 106 to a display interface 122 configured to connect the computing device 100 to a display device 124. The display device 124 may include a display screen that is a built-in component of the computing device 100. The display device 124 may also include a computer monitor, television, or projector, among others, that is externally connected to the computing device 100.

The computing device also includes a storage device 126. The storage device 126 is a physical memory such as a hard drive, an optical drive, a thumbdrive, an array of drives, or any combinations thereof. The storage device 126 may also include remote storage drives. The storage device 126 may also include applications 128. The applications 128 may be human computer interaction applications, such as gesture recognition. Human computer interaction applications benefit from depth images of an object, as traditional RGB images do not provide enough data to sufficiently analyze the image and recognize gesture, body pose or facial expression. The computing device 100 may also include a sensor hub engine 130. In some cases, a sensor hub engine includes software that enables the functionality of sensors of the sensor hub 114 within the computing device 100. The sensor hub engine 130 may also include sensors similar to the sensor hub 114.

The computing device 100 may also include a network interface controller (NIC) 132 may be configured to connect the computing device 100 through the bus 106 to a network 134. The network 134 may be a wide area network (WAN), local area network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

As noted above, the components used in stereoscopic imaging are placed asymmetrically. The components can include a plurality of sensors and a plurality of emitters. Through such a placement, any contradicting effects of the optical distance in both passive and active stereo depth camera systems can be overcome.

Optical distance may be also known as the baseline distance. In some cases, the optical distance is the distance between two sensors. The optical distance may also be the distance between a sensor and an emitter. Optical distance has various contradicting effects on the performance of stereo systems, both active stereo systems and passive stereo systems. First, as optical distance increases, matching between images from the two sensors becomes harder because of occlusions. Matching also becomes more difficult because objects with variable depths will be viewed differently by both sensors, leaving few, if any matching regions. Matching may also be known as stereo correspondence, and can be performed using two or more images of the same scene, taken from different points of view. A set of points is found in one image that are also found or identified in another image. In some cases, matching is done using features within each image. Accordingly, in matching or stereo correspondence, a feature found in one image is also found or identified in another image. In some cases, the plurality of images are obtained using a single sensor at different positions. The plurality of images may also be obtained using a single sensor at different points in time. Moreover, multiple sensors can be used to obtain images for matching. The objects in the scene may also be in general motion relative to the one or more sensors.

The second contradicting effect is that given the correct pixel resolution disparity, the depth measurement is more accurate. Since the images are sampled from each sensor, disparity can be measured only up to pixel accuracy. Thus, there is an assumption of a half pixel error in the disparity measurement. When the disparity is transformed to depth, this error is reduced as the optical distance increases.

For example, consider a pair of a pinhole and fully aligned image sensors. Assume the focal length of each sensor is one pixel, and pixel size of both sensors is one pixel. Further, the optical center of the left sensor is at the origin of a world coordinate system:

$$O_l = \{0,0,0\}$$

The optical center of the right camera is:

$$O_r = \{d,0,0\}$$

Consider a point $\{x,y,z\}$. As observed by the left sensor, the point is mapped as follows:

$$\{x_l, y_l\} = \{x/z, y/z\}$$

As observed by the right sensor, the point is mapped as follows:

$$\{x_r, y_r\} = \{x-d-z, y/z\}$$

Give the X coordinate of both points in the left and right sensors, a depth value (Z) can be extracted. Specifically, the depth is:

$$z = \frac{d}{\left(\frac{d}{z}\right)} = \frac{d}{\left(\frac{d}{x_l - x_r}\right)}$$

Note that the observed sampled pixel values are $x_l$ and $x_l$, and not an accurate depth value. A combined error E in both pixels and $x_l$ and $x_l$ positions will cause an error E, in the calculated value.

$$Z + E = \frac{d}{x_l - x_r + \varepsilon}$$

To calculate the dependence of E on d we take the difference:

$$E(d) = \frac{d}{x_l - x_r} - \frac{d}{x_l - x_r + \varepsilon} = \frac{d}{\left(\frac{d}{z}\right)} - = \frac{d}{\left(\frac{d}{z}\right) + \varepsilon} == \frac{\varepsilon Z^2}{d + \varepsilon Z}$$

Accordingly, the accuracy of Z increases inverse-linearly with the optical distance. However, increasing the optical distance degrades the matching process and thus increases the likelihood of error.

Suppose the object is a tilted plane. The objects coordinates for $\{x_0+t, y_0, z_0+at\}$, and a window of size K by K is used for matching. In order for the matching to be successful, both windows in the left and right cameras should appear similar. They will never be exactly similar due to sub-pixel sampling and noise. This is because as a increases, where a is the depth slope of the object, the dissimilarity between left and right windows will increase and degrade the matching process. Let p be the left boundary of the window, $p=\{x_0,y_0,z_0\}$, and q be the right boundary, $q=\{x_0+k,y_0,z_0+ak\}$.

The coordinates of these points in both left (l) and right (r) cameras are as follows:

$$p_l = \{x_0/z_0, y_0/z_0\}, \quad q_l = \{(x_0+k)/(z_0+ak), y_0/(z_0+ak)\}$$

$$p_r = \{(x_0+d)/z_0, y_0/z_0\}, \quad q_r = \{(x_0+k+d)/(z_0+ak), y_0/(z_0+ak)\}$$

The disparities between the two points, p and q are as follows:

$$p_l - p_r = (x_0/z_0) - (x_0+d)/z_0 = d/z_0$$

$$q_l - q_r = ((x_0+k)/(z_0+ak)) - ((x_0+k+d)/(z_0+ak)) = d/(z_0+ak)$$

Assume a is one (tilted plane at 45 degrees) k is 5 (small window). The pixel size is 0.0001 cm, at 1 m a pixel scale to 1 mm, and d is 1 cm we see that at 1 meter distance the right window is distorted by (d*(0.5/10000))/0.0001 0.5 pixel compare to the left window. Increasing the optical distance will increase this distortion and will degrade the matching accuracy. This results in the relative deformation of tilted object is increased as the optical center increases. However, by placing the components used in stereoscopic imaging asymmetrically, an accurate depth is obtained without reformation of a tiled object as the optical center increases.

Figure 2:
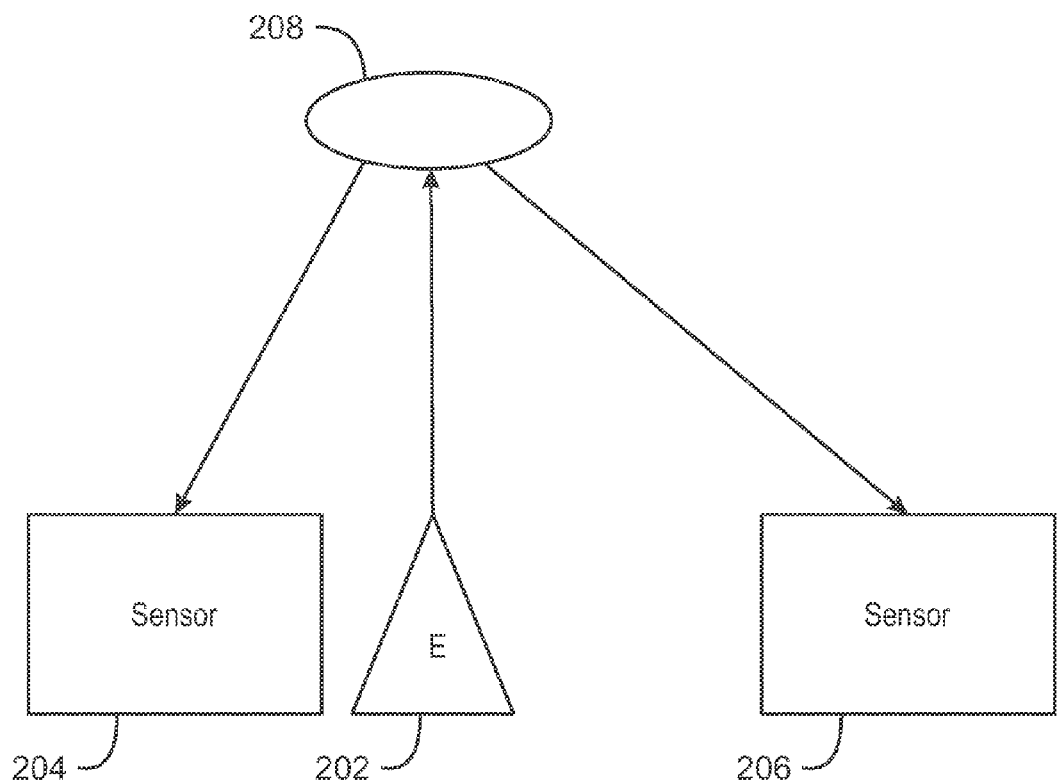
FIG. 2 is an example of an emitter and sensor arrangement.

FIG. 2 is an example of an emitter and sensor arrangement 200. In the arrangement 200, an emitter 202 is placed closer to a left sensor 204 when compared to the distance between the emitter 202 and a right sensor 206. In FIG. 2, the emitter 202, the left sensor 204, and the right sensor 206 are used to capture information from an area 208 that may include various objects and features. The left sensor 204 and the emitter 202 can be used to create a depth map, which may be sparse and of low accuracy. Typically, the depth map is an image that includes information to convey the distance of the surfaces of objects within the image from particular a viewpoint. However, a single sensor provides a single data value for each point in the image. The single data value may not provide enough information to derive a complete depth map. The depth map provided by the emitter 202 and the left sensor is considered sparse in that it is accurate at particular features of the image, such as the edges of the image or protruding objects within the image. In some cases, the sparse depth map is found by doing a stereo correspondence between the two sensors.

Since the depth map provided by the left sensor 204 and the emitter 202 is a sparse depth map, it does not provide the accuracy necessary for applications that use depth information. Accordingly, the sparse depth map is used as an initial approximation of a final depth map. By placing the left sensor 204 close to the emitter 202, the left sensor 204 has short optical distance to the emitter to enable high accuracy matching. The emitter 202 and sensor pair can be use to match the an image captured by the left sensor to a known pattern projected by the emitter at a given distance. This technique is used to capture the sparse depth map, similar to a structured light approach as described above.

The right sensor is also used to obtain an image. The image from the right sensor is used to refine the sparse depth map obtained from the left sensor 204 and the emitter 202. In some cases, matching between the left and right sensor data is performed to refine the depth map. Additionally, in some cases, structured light between the right sensor and a known pattern is used to refine the depth map. The depth map obtained after refinement is of a higher accuracy due to large optical distance and the matching process at the large optical distance is only a refinement such that the matching is performed for pixels near the disparity found in the first phase.

Figure 3:
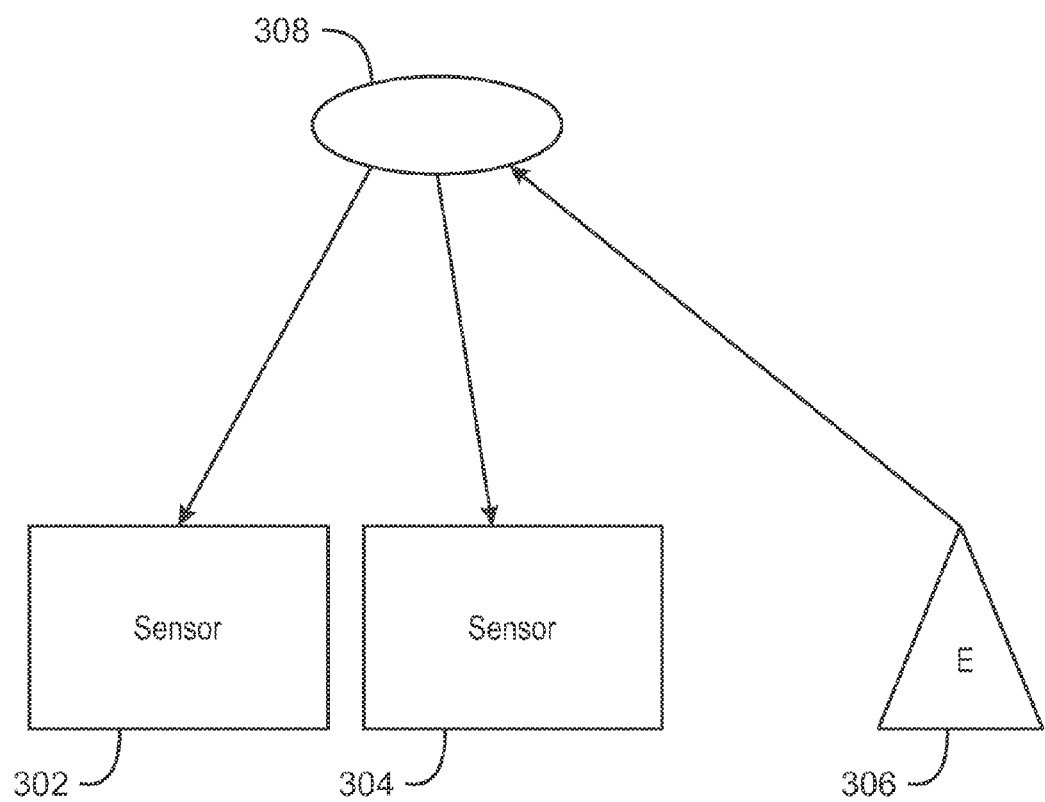
FIG. 3 is another example of an emitter and sensor arrangement.

FIG. 3 is an example of an emitter and sensor arrangement 300. A left sensor 302 is close to a right sensor 304. The emitter 306 is to the far right of both the left sensor 302 and the right sensor 304. In FIG. 3, the emitter 306, the left sensor 302, and the right sensor 304 are used to capture information from an area 308 that may include various objects and features. By having the left sensor 302 and the right sensor 304 close to each other, a low accuracy yet dense depth map is provided. The matching between the right sensor 304 and the far emitter 306 through structured light provides a refinement of the depth map for some of the pixels. In some cases, measurements are not refined for all of the pixels because the resolution of the image projected by the emitter is less than the resolution of sensor. In embodiments, a coded structured light correspondence between the sensors and the emitter can be used to find a depth map.

Interpolation of the "low resolution-high accuracy" depth map and the "low accuracy dense" initial map can be applied to provide "high resolution and dense" depth map. In some cases, the interpolation can be considered smart interpolation. In embodiments, the low-resolution high accuracy depth map can be obtained as described in FIG. 2. In embodiments, the "low accuracy dense" depth map can be obtained as described in FIG. 3. Further, in embodiments, two different patterns emitted by the emitter. The first pattern may have a low duty cycle that is suitable for active stereo uses. The second pattern may be a high frequency patter that is used for sub-pixel refinement with structure light or coded light techniques. Since the second pattern is used only for refinement around the initial results from the active stereo, there are no multi-patterns or movement issues. In some cases, two emitters are used to emit the patterns. A first emitter can be used for structured light techniques with objects at a relatively short range, and a second emitter can be used for structured light techniques with objects at a relatively long range.

Figure 4:
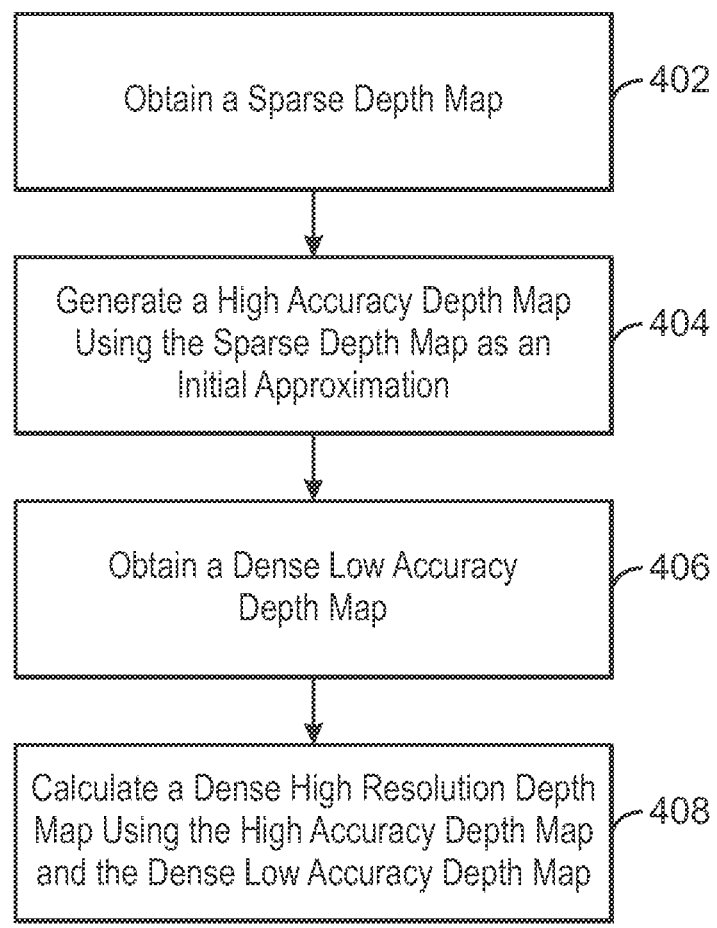
FIG. 4 is a process flow diagram of a method for structured stereo.

FIG. 4 is a process flow diagram of a method 400 for structured stereo. At block 402, a sparse depth map of low accuracy is obtained. In some cases, the sparse depth map can be generated using an emitter with two sensors, where the emitter is located closer to a first sensor in order to vary the optical distance. In this manner, contradicting effects of optical distance will not affect the resulting depth map. In some cases, the high accuracy depth map is a sparse depth map as described in FIG. 2. At block 404, a high accuracy depth map using the sparse depth map of low accuracy as an initial approximation is generated. In some cases, the high accuracy depth map is generated by refining the sparse depth map of low accuracy using structured light techniques between a sensor and an emitter. Additionally, the high accuracy depth map can be generated using matching techniques between at least two sensors and structured light techniques between a sensor and an emitter, wherein the emitter projects a first pattern with a low duty cycle, and the emitter projects a second pattern for sub-pixel refinement of the dense low accuracy depth map.

At block 406, a dense low accuracy depth map is obtained. In embodiments, two sensors that are positioned in close proximity to one another can be used to generate the dense depth map. In some cases, the dense depth map is generated as described in FIG. 3. The depth map from the two sensors can be refined using structured light techniques. At block 408, the dense high resolution depth map is calculated using the high accuracy depth map and the dense low accuracy depth map. In some cases, the high accuracy depth map and the dense depth map are interpolated to calculate the high resolution and dense depth map. Additionally, the dense high resolution depth map may be calculated by obtaining the high accuracy depth map using active stereo techniques and the dense low accuracy depth map using structured light techniques. As a result, the present techniques may be considered a hybrid active stereo and structured light solution.

Figure 5:
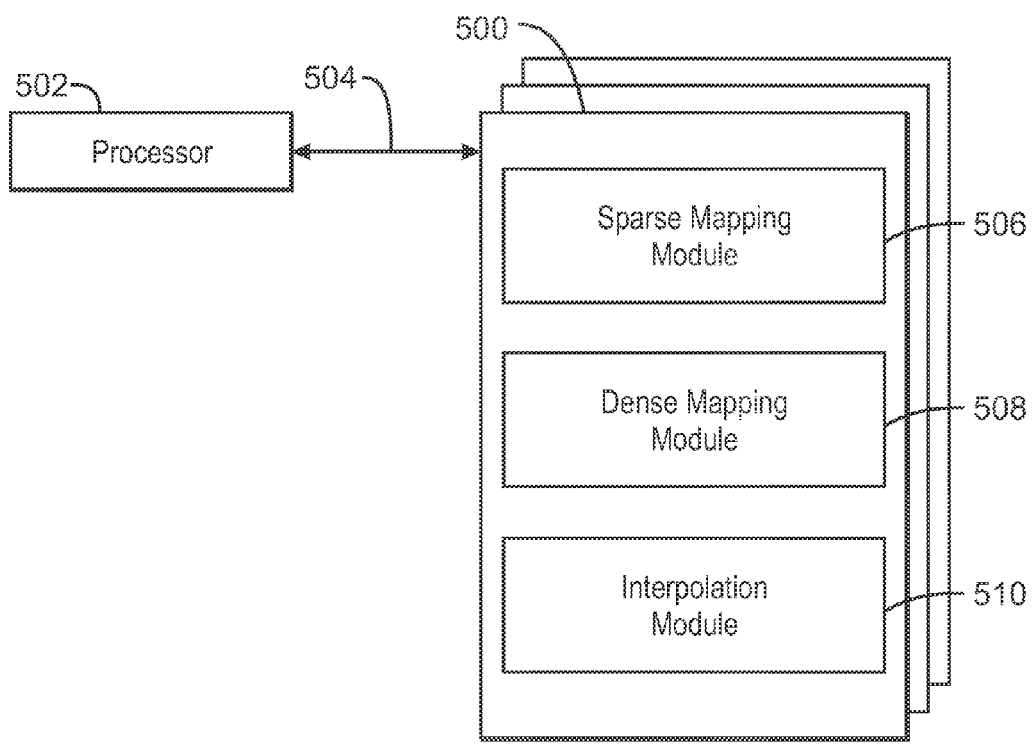
FIG. 5 is a block diagram showing tangible, non-transitory computer-readable media that stores code for structured stereo.

FIG. 5 is a block diagram showing tangible, non-transitory computer-readable media 500 that stores code for structured stereo. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. For example, a sparse mapping module 506 may be configured to generate a sparse depth map with asymmetrically placed sensors. The depth map generated by the sparse mapping module 506 may also a high accuracy depth map. At block 508, a dense mapping module may be configured to generate a dense depth map with asymmetrically placed sensors. In such a scenario, an emitter may be placed a distance from two sensors, as illustrated in FIG. 3. The depth map generated by the dense mapping module 508 may also a low resolution depth map. At block 510, an interpolation module may interpolate the depth maps from the sparse mapping module 506 and the dense mapping module 508 to obtain a depth map that is both highly accurate and dense.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

In embodiments, the present techniques combine two depth estimation techniques. By using active stereo techniques, the depth map is more robust to environmental conditions and has higher output resolution. By also using structured light techniques, a depth map is obtained that is considered accurate. The active stereo can use an emitter and a plurality of image capture mechanisms such as a camera or sensor. A first subsystem includes at least an emitter and image capture mechanism, and has components placed such that there is a short optical distance between the components to enable high accuracy matching. A second subsystem includes at least an emitter and image capture mechanism, and has components placed such that there is a long optical distance to enable high accuracy depth (Z) calculations. In some cases, an asymmetrical placement of the image capture mechanisms around emitter results in variations in the optical distance. Moreover, an emitter-image capture mechanism pair can be used to match the current captured image to a known pattern projected at a given distance.

Example 1

An apparatus for structured stereo is described herein. The apparatus includes an emitter and plurality of sensors. The sensors are asymmetrically placed with respect to the emitter.

The emitter and the plurality of sensors may obtain data that can be used to generate a sparse depth map, and the sparse depth map may be further refined to obtain an accurate depth map. The emitter and the plurality of sensors may also to obtain data that may be used to generate a sparse depth map, where the sparse depth map may be a result of a small optical distance between the emitter and a sensor of the plurality of sensors. Further, the emitter and the plurality of sensors may obtain data that can be used to generate a sparse depth map, which may be further refined to obtain an accurate depth map, where the refinement may be obtained as a result of a large optical distance between the emitter and a sensor of the plurality of sensors. Also, the emitter and the plurality of sensors may obtain data that may be used to generate a dense depth map with low accuracy. The emitter and the plurality of sensors may obtain data that can be used to generate a dense depth map with low accuracy, where the dense depth map may be a result of a large optical distance between the emitter and a sensor of the plurality of sensors. The emitter and the plurality of sensors may obtain data that can be used to generate a dense depth map with low accuracy, where the dense depth map may be refined using data from a result of a smaller optical distance between the emitter and a sensor of the plurality of sensors. Further, the emitter and the plurality of sensors can be used in an active stereo technique combined with a structured light technique to obtain a dense depth map with a high resolution. An optical distance between the emitter and the plurality of sensors can be adjusted in response to a type of depth map to be generated. The apparatus may include a second emitter.

Example 2

A system for structured stereo is described herein. The system includes an emitter, a plurality of sensors, a memory, and a processor. The emitter and the sensors are asymmetrically placed in the system with respect to the emitter. The memory that is to store instructions and is communicatively coupled to the emitter and plurality of sensors. The processor is communicatively coupled to the memory. When the processor is to execute the instructions, the processor is to generate a high accuracy depth map and generate a dense depth map. The processor is also to calculate a high resolution and dense depth map using the high accuracy depth map and the dense depth map.

The emitter may be between at least two sensors of the plurality of sensors, and a distance between the emitter and a first sensor may be shorter than a distance between the emitter and a second sensor. A distance between a first sensor and a second sensor of the plurality of sensors may be shorter than a distance between the first sensor and the emitter and the second sensor and the emitter, such that the first sensor and the second sensor are close together and the first sensor and the second sensor are far from the emitter. Further, the processor may generate the high accuracy depth map by obtaining a sparse depth map of low accuracy and refining the sparse depth map of low accuracy by matching between the plurality of sensors to obtain the high accuracy depth map. Additionally, the processor may generate the high accuracy depth map by obtaining a sparse depth map of low accuracy, and refining the sparse depth map of low accuracy by matching between the plurality of sensors, wherein an image from a sensor to be matched may be obtained using structured light between the sensor and a pattern from the emitter. The matching may be performed for pixels near a disparity found when obtaining the sparse depth map of low accuracy. Also, the processor may generate the dense depth map with data from a first sensor and a second sensor of the plurality of sensors, where the distance between the first sensor and the second sensor may be shorter than a distance between the first sensor and the emitter and the second sensor and the emitter, such that the first sensor and the second sensor are close together and the first sensor and the second sensor are far from the emitter. Moreover, the processor may generate the dense depth map with data from a first sensor and a second sensor of the plurality of sensors, and refine the dense depth map by matching between the first sensor or the second sensor and the emitter, where the distance between the first sensor and the second sensor may be shorter than a distance between the first sensor and the emitter and the second sensor and the emitter, such that the first sensor and the second sensor are close together and the first sensor and the second sensor are far from the emitter. The emitter may project a first pattern with a low duty cycle for active stereo and a second pattern with a high frequency for refinement with structured light. A second emitter, wherein the emitter may project a first pattern with a low duty cycle for active stereo and the second emitter may project a second pattern with a high frequency for refinement with structured light. The plurality of sensors may be image sensors. Further, the system may be a component of a camera.

Example 3

A method for hybrid active stereo and structured light is described herein. The method includes obtaining a sparse depth map of low accuracy, and generating a high accuracy depth map using the sparse depth map of low accuracy as an initial approximation. The method also includes obtaining a dense low accuracy depth map, and calculating a dense high resolution depth map using the high accuracy depth map and the dense low accuracy depth map.

The sparse depth map of low accuracy may be obtained using data from a sensor and an emitter. The high accuracy depth map may be generated by refining the sparse depth map of low accuracy using structured light techniques between a sensor and an emitter. Additionally, the high accuracy depth map may be generated using matching techniques between at least two sensors and structured light techniques between a sensor and an emitter. The dense low accuracy depth map can be obtained using at least two sensors. Further, the dense low accuracy depth map can be obtained using at least two sensors and refining the data from the at least two sensors using an emitter. Moreover, the high accuracy depth map can be generated using matching techniques between at least two sensors and structured light techniques between a sensor and an emitter, wherein the emitter projects a first pattern with a low duty cycle, and the emitter projects a second pattern for sub-pixel refinement of the dense low accuracy depth map. The method may also include an asymmetric placement of an emitter and sensor used to obtain the sparse depth map of low accuracy and dense low accuracy depth map. The dense high resolution depth map can be calculated by obtaining the high accuracy depth map using active stereo techniques and the dense low accuracy depth map using structured light techniques. Additionally, a dense high resolution depth map can be calculated for a human computer interaction application.

Example 4

A tangible, non-transitory, computer-readable medium comprising code is described herein. The code directs a processor to generate a high accuracy depth map and generate a dense depth map. The code also directs a processor to calculate a high resolution and dense depth map using the high accuracy depth map and the dense depth map.

The high accuracy depth map may be generated by obtaining a sparse depth map of low accuracy using data from a sensor and an emitter and refining the sparse depth map. Further, the high accuracy depth map may be generated by refining a sparse depth map using structured light techniques between a sensor and an emitter. The high accuracy depth map can also be generated using matching techniques between at least two sensors and structured light techniques between a sensor and an emitter. The dense depth map may be generated using at least two sensors. Further, the dense depth map can be generated using at least two sensors and refining the data from the at least two sensors using an emitter. Also, the high accuracy depth map can be generated using matching techniques between at least two sensors and structured light techniques between a sensor and an emitter, wherein the emitter projects a first pattern with a low duty cycle, and the emitter projects a second pattern for sub-pixel refinement of the dense depth map. An asymmetric placement of an emitter and sensor may be used to obtain data to generate the high accuracy depth map and the dense depth map. The high resolution and dense depth map can be calculated by obtaining the high accuracy depth map using active stereo techniques and the dense depth map using structured light techniques. Further, the high resolution and dense depth map may be calculated for a human computer interaction application.

Example 5

An apparatus for structured stereo includes an emitter and a means to obtain depth data. The means to obtain depth data is asymmetrically placed with respect to the emitter.

The emitter and the means to obtain depth data may obtain data that can be used to generate a sparse depth map, and the sparse depth map may be further refined to obtain an accurate depth map. The emitter and the means to obtain depth data may obtain data that can be used to generate a sparse depth map, where the sparse depth map is a result of a small optical distance between the emitter and the means to obtain depth data. The emitter and the means to obtain depth data may obtain data that is used to generate a sparse depth map, which can be further refined to obtain an accurate depth map, where the refinement may be obtained as a result of a large optical distance between the emitter and the means to obtain depth data. Further the emitter and the means to obtain depth data may obtain data that is used to generate a dense depth map with low accuracy. The emitter and the means to obtain depth data may obtain data that is used to generate a dense depth map with low accuracy, where the dense depth map is a result of a large optical distance between the emitter and the means to obtain depth data. Additionally, the emitter and the means to obtain depth data may obtain data that is used to generate a dense depth map with low accuracy, where the dense depth map can be refined using data from a result of a smaller optical distance between the emitter and the means to obtain depth data. The emitter and the means to obtain depth data may be used in an active stereo technique combined with a structured light technique to obtain a dense depth map with a high resolution. An optical distance between the emitter and the means to obtain depth data can be adjusted in response to a type of depth map to be generated. The apparatus may also include a second emitter.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for structured stereo, comprising:
an emitter;
a plurality of sensors, wherein the sensors are asymmetrically placed with respect to the emitter and wherein an optical distance between the emitter and the plurality of sensors is adjusted in response to a type of depth map to be generated.

2. The apparatus of claim 1, wherein the emitter and the plurality of sensors are to obtain data that is used to generate a sparse depth map, and the sparse depth map is further refined to obtain an accurate depth map.

3. The apparatus of claim 1, wherein the emitter and the plurality of sensors are to obtain data that is used to generate a sparse depth map, where the sparse depth map is a result of a small optical distance between the emitter and a sensor of the plurality of sensors.

4. The apparatus of claim 1, wherein the emitter and the plurality of sensors are to obtain data that is used to generate a sparse depth map, which is further refined to obtain an accurate depth map, where the refinement is obtained as a result of a large optical distance between the emitter and a sensor of the plurality of sensors.

5. The apparatus of claim 1, wherein the emitter and the plurality of sensors are to obtain data that is used to generate a dense depth map with low accuracy.

6. The apparatus of claim 1, wherein the emitter and the plurality of sensors are to obtain data that is used to generate a dense depth map with low accuracy, where the dense depth map is a result of a large optical distance between the emitter and a sensor of the plurality of sensors.

7. The apparatus of claim 1, wherein the emitter and the plurality of sensors are to obtain data that is used to generate a dense depth map with low accuracy, where the dense depth map is refined using data from a result of a smaller optical distance between the emitter and a sensor of the plurality of sensors.

8. The apparatus of claim 1, wherein the emitter and the plurality of sensors are used in an active stereo technique combined with a structured light technique to obtain a dense depth map with a high resolution.

9. A system for structured stereo, comprising:
an emitter;
a plurality of sensors, wherein the emitter and the sensors are asymmetrically placed in the system with respect to the emitter;
a memory that is to store instructions and that is communicatively coupled to the emitter and plurality of sensors; and
a processor communicatively coupled to the memory, wherein when the processor is to execute the instructions, the processor is to:
generate a high accuracy depth map;
generate a dense depth map; and
calculate a high resolution and dense depth map using the high accuracy depth map and the dense depth map.

10. The system of claim 9, wherein the emitter is between at least two sensors of the plurality of sensors, and a distance between the emitter and a first sensor is shorter than a distance between the emitter and a second sensor.

11. The system of claim 9, wherein a distance between a first sensor and a second sensor of the plurality of sensors is shorter than a distance between the first sensor and the emitter and the second sensor and the emitter, such that the first sensor and the second sensor are close together and the first sensor and the second sensor are far from the emitter.

12. The system of claim 9, wherein the processor is to generate the high accuracy depth map by obtaining a sparse depth map of low accuracy and refining the sparse depth map of low accuracy by matching between the plurality of sensors to obtain the high accuracy depth map.

13. The system of claim 9, wherein the processor is to generate the high accuracy depth map by obtaining a sparse depth map of low accuracy, and refining the sparse depth map of low accuracy by matching between the plurality of sensors, wherein an image from a sensor to be matched is to be obtained using structured light between the sensor and a pattern from the emitter.

14. The system of claim 9, wherein the processor is to generate the dense depth map with data from a first sensor and a second sensor of the plurality of sensors, where the distance between the first sensor and the second sensor is shorter than a distance between the first sensor and the emitter and the second sensor and the emitter, such that the first sensor and the second sensor are close together and the first sensor and the second sensor are far from the emitter.

15. The system of claim 9, wherein the processor is to generate the dense depth map with data from a first sensor and a second sensor of the plurality of sensors, and refine the dense depth map by matching between the first sensor or the second sensor and the emitter, where the distance between the first sensor and the second sensor is shorter than a distance between the first sensor and the emitter and the second sensor and the emitter, such that the first sensor and the second sensor are close together and the first sensor and the second sensor are far from the emitter.

16. The system of claim 9, wherein the emitter is to project a first pattern with a low duty cycle for active stereo and a second pattern with a high frequency for refinement with structured light.

17. The system of claim 9, wherein the plurality of sensors are image sensors.

18. The system of claim 9, wherein the system is a component of a camera.

19. A method for hybrid active stereo and structured light, comprising obtaining a sparse depth map of low accuracy;
generating a high accuracy depth map using the sparse depth map of low accuracy as an initial approximation;
obtaining a dense low accuracy depth map; and
calculating a dense high resolution depth map using the high accuracy depth map and the dense low accuracy depth map.

20. The method of claim 19, comprising obtaining the sparse depth map of low accuracy using data from a sensor and an emitter.

21. The method of claim 19, comprising generating the high accuracy depth map by refining the sparse depth map of low accuracy using structured light techniques between a sensor and an emitter.

22. The method of claim 19, comprising generating the high accuracy depth map using matching techniques between at least two sensors and structured light techniques between a sensor and an emitter.

23. The method of claim 19, comprising obtaining the dense low accuracy depth map using at least two sensors.

24. The method of claim 19, comprising obtaining the dense low accuracy depth map using at least two sensors and refining the data from the at least two sensors using an emitter.

* * * * *